(12) United States Patent
Luo

(10) Patent No.: US 10,132,982 B2
(45) Date of Patent: Nov. 20, 2018

(54) LIGHT GUIDE PLATE, BACKLIGHT MODULE AND DISPLAY APPARATUS

(71) Applicants: BOE Technology Group Co., Ltd., Beijing (CN); BOE Optical Science and Technology Co., Ltd., Suzhou (CN)

(72) Inventor: Weizhao Luo, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 13 days.

(21) Appl. No.: 15/500,945

(22) PCT Filed: Jun. 29, 2016

(86) PCT No.: PCT/CN2016/087601
§ 371 (c)(1),
(2) Date: Feb. 1, 2017

(87) PCT Pub. No.: WO2017/063381
PCT Pub. Date: Apr. 20, 2017

(65) Prior Publication Data
US 2017/0269282 A1 Sep. 21, 2017

(30) Foreign Application Priority Data

Oct. 12, 2015 (CN) .................. 2015 2 0787959 U

(51) Int. Cl.
*F21V 8/00* (2006.01)
(52) U.S. Cl.
CPC ......... *G02B 6/0036* (2013.01); *G02B 6/0051* (2013.01); *G02B 6/0053* (2013.01);
(Continued)

(58) Field of Classification Search
CPC .. G02B 6/0093; G02B 6/0036; G02B 6/0058; G02B 6/0051; G02B 6/0053; G02B 6/0055; G02B 6/0065; G02B 6/0088
See application file for complete search history.

(56) References Cited

U.S. PATENT DOCUMENTS

| 2004/0145915 | A1* | 7/2004 | Kim | .................. G02B 6/0036 362/559 |
| 2008/0151549 | A1* | 6/2008 | Hsu | .................. G02B 1/105 362/296.07 |

(Continued)

FOREIGN PATENT DOCUMENTS

| CN | 201903665 U | * | 7/2011 |
| CN | 203223817 U | * | 10/2013 |

(Continued)

OTHER PUBLICATIONS

International Search Report and Written Opinion of International Application No. PCT/CN2016/087601, dated Sep. 1, 2016, 10 pages.

(Continued)

*Primary Examiner* — Anh Mai
*Assistant Examiner* — Fatima Farokhrooz
(74) *Attorney, Agent, or Firm* — Westman, Champlin & Koehler, P.A.

(57) ABSTRACT

Embodiments of the present disclosure provide a light guide plate, a backlight module and a display apparatus. The light guide plate includes a first surface and a second surface arranged opposite to the first surface. The second surface includes a network node region in which a plurality of network nodes are provided, so that light entering the light guide plate is capable of exiting from the first surface; and at least one protrusions, located at a region between an outer edge of the network node region of the second surface and an edge of the light guide plate, a height of the protrusion (Continued)

which projects from the second surface is larger than that of the network node which projects from the second surface.

18 Claims, 3 Drawing Sheets

(52) U.S. Cl.
CPC ......... *G02B 6/0055* (2013.01); *G02B 6/0065* (2013.01); *G02B 6/0088* (2013.01)

(56) References Cited

U.S. PATENT DOCUMENTS

| | | | |
|---|---|---|---|
| 2009/0033830 A1 | 2/2009 | Tsai et al. | |
| 2009/0130342 A1* | 5/2009 | Endo .................. | B29C 47/0021 |
| | | | 428/1.3 |
| 2011/0234942 A1* | 9/2011 | Nakagome .......... | G02B 5/0226 |
| | | | 349/64 |
| 2012/0014134 A1* | 1/2012 | Fang ................... | G02B 6/0073 |
| | | | 362/612 |
| 2012/0051705 A1* | 3/2012 | Greener ............... | B29C 43/222 |
| | | | 385/131 |
| 2013/0058130 A1* | 3/2013 | Hu ....................... | G02B 6/0036 |
| | | | 362/613 |
| 2014/0055717 A1* | 2/2014 | Benson ................ | G02B 6/0093 |
| | | | 349/64 |
| 2014/0092622 A1* | 4/2014 | Pijlman ............... | G02B 6/0046 |
| | | | 362/555 |
| 2015/0124197 A1* | 5/2015 | Yeom .................. | G02B 6/0091 |
| | | | 349/65 |

FOREIGN PATENT DOCUMENTS

| | | |
|---|---|---|
| CN | 203757522 U | 8/2014 |
| CN | 204187534 U | 3/2015 |
| CN | 204964802 U | 1/2016 |

OTHER PUBLICATIONS

English translation of Box No. V of the Written Opinion for the International Searching Authority for International Application No. PCT/CN2016/087601, 2 pages.

* cited by examiner

LIGHT GUIDE PLATE, BACKLIGHT MODULE AND DISPLAY APPARATUS

CROSS-REFERENCE TO RELATED APPLICATION

This application is a Section 371 National Stage Application of International Application No. PCT/CN2016/087601, filed on Jun. 29, 2016, entitled "LIGHT GUIDE PLATE, BACKLIGHT MODULE AND DISPLAY APPARATUS", which has not yet published, and which claims priority to Chinese Application No. 201520787959.4, filed on Oct. 12, 2015, incorporated herein by reference in their entirety.

BACKGROUND OF THE DISCLOSURE

Field of the Disclosure

Embodiments of the present disclosure relate to a display apparatus, more particularly, to a light guide plate, a backlight module and a display apparatus incorporating the light guide plate.

Description of the Related Art

A light guide plate is an important component in a small and medium backlight source, which is used to convert a point light source or a line light source into a surface light source. It can be applied into panel display apparatuses such as liquid crystal displays, notebook computers, digital cameras, monitors and projectors, for providing an output of light having uniform brightness in a form of a surface light source. In this way, the panel display apparatus can normally display images. LEDs (Light Emitting Diodes) have been widely used as a light source for a light guide plate within the backlight source.

Generally speaking, light rays emitted from the LED light source are incident onto the light guide plate, and propagate along light travel paths within the light guide plate. The light rays will be reflected and diffused by network nodes on a lower surface of the light guide plate, and then travel to an upper surface of the light guide plate along the paths, so as to adjust the uniformity of the light rays. After passing through the upper surface of the light guide plate, the light rays will be refracted, and pass through a diffuser having a function of homogenizing light and a light intensity enhancement sheet having a function of collecting light to improve the brightness and uniformity of the light source through a plurality of travel paths. Finally, the light rays exit along a direction perpendicular to a display panel, and display an image on the display panel.

In order to enhance luminous efficiency of the light guide plate, a reflection sheet is provided below the light guide plate so that the light rays incident on the reflection sheet from the lower surface of the light guide plate can be reflected to the upper surface of the light guide plate. However, in the existing backlight module, the lower surface of the light guide plate will make a contact with the reflection sheet, so that the network nodes at a node region of the light guide plate will be in a close contact with a reflection face of the reflection sheet. The nodes and the reflection face of the reflection sheet will rub with each other, causing the nodes to be worn out easily. Especially in a small sized display apparatus, a node face of the light guide plate in the backlight module is provided to be in a face contact with the reflection face of the reflection sheet. It tends to be scratched by foreign matters on the reflection face of the reflection sheet, resulting in bad operation of the light guide plate, and directly influencing picture quality of the display apparatus.

SUMMARY

In order to at least partially alleviate the defects and/or deficiency in the prior art, embodiments of the present application provides a light guide plate, a backlight module and a display apparatus.

In accordance with one aspect of the embodiments of the present application, it provides a light guide plate, including a first surface and a second surface arranged opposite to the first surface, wherein the second surface includes:

a network node region in which a plurality of network nodes are provided, so that light entering the light guide plate is capable of exiting from the first surface; and at least one protrusions, located at a region between an outer edge of the network node region of the second surface and an edge of the light guide plate, wherein a height of the protrusion which projects from the second surface is larger than that of the network node which projects from the second surface.

In one example, the light guide plate is made of a polycarbonate material, and the network nodes and the protrusions are integrally formed onto the second surface of the light guide plate.

In one example, the height of the protrusion which projects from the second surface is at least 10 µm larger than that of the network node which projects from the second surface.

In one example, the height of the protrusion which projects from the second surface is within a range of 15 to 25 µm.

In one example, the second surface of the light guide plate is substantially rectangular, and the protrusion has a dimension in a lengthwise direction of the rectangular light guide plate within a range of 0.7 to 1.3 millimeters and a dimension in a widthwise direction of the rectangular light guide plate within a range of 1.2 to 1.8 millimeters.

In one example, a thickness of the light guide plate is within a range of 0.7 to 1 millimeters, a length of the light guide plate is in a range of 60 to 72 millimeters, and a width thereof is in a range of 32 to 40 millimeters.

In one example, the at least one protrusions comprise a plurality of the protrusions which are arranged around the network node region.

In one example, the second surface includes one continuous protrusion around the network node region which is formed thereon with a plurality of sub-protrusions.

In one example, a plurality of the protrusions are provided to be separated from each other between the network node region and the edge of the light guide plate, without being adjoined with each other.

In one example, at least one protrusion to be separated is provided at each of an edge of the light guide plate along a lengthwise direction thereof and an edge of the light guide plate along a widthwise direction thereof, and each of the at least one protrusion to be separated includes at least one projection.

In one example, the protrusions are provided to be a continuous cofferdam structure around the network node region.

In accordance with a second aspect of the embodiments of the present application, it provides a backlight module, including:

the light guide plate as described in any of the above embodiments; and a reflection plate, provided to face the second surface of the light guide plate, and the protrusions corresponding to an edge of the reflection plate.

In one example, the backlight module further including:
a light source provided at a side of the light guide plate;
a diffuser provided on the first surface of the light guide plate; and
a first prism provided onto the diffuser.

In one example, the backlight module further including:
a second prism provided onto the first prism;
a back plate into which the reflection plate, the light guide plate, the diffuser, the first prism and the second prism are installed; and
a sealing frame installed at an inner side of the back plate.

In one example, the light source includes at least one LED strip provided at an upper edge of the second prism.

In one example, the backlight module further including a light shielding zone provided onto the second prism and covering the LED strip and the edge of the second prism.

In accordance with a further aspect of the embodiments of the present application, it provides a display apparatus, including:
the backlight module described in any of the above embodiments; and
a display panel, mounted at a light exiting side of the backlight module.

BRIEF DESCRIPTION OF THE DRAWINGS

In order to make objectives, technical solutions and advantages of embodiments of the present disclosure become clear, the present disclosure will be described in detail with reference to the specific embodiments in conjunction with the accompanying drawings, in which.

DETAILED DESCRIPTION OF PREFERRED EMBODIMENTS OF THE DISCLOSURE

Figure 1:
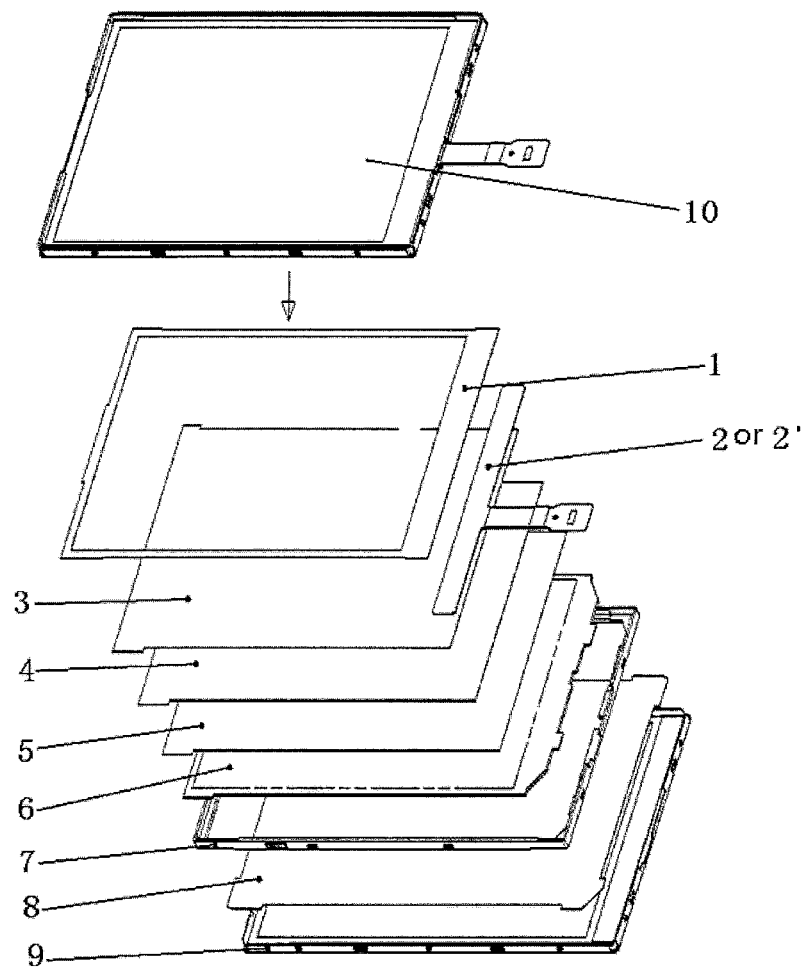
FIG. 1 is an exploded and prospective view for schematically showing a display apparatus in accordance with a first illustrative embodiment of present application.

Technical solutions of embodiments of the present invention will be further explained below with reference to the figures. Throughout the specification, same or similar reference symbols indicate same or similar components. The following explanation to the embodiments with reference to the accompanying drawings is intended to interpret a general inventive concept of the present embodiments, rather than limiting the scope of the present application.

In addition, for sake of explanation, numerous specific details are set forth in the following detailed description, in order to provide a fully understanding of the disclosed embodiment. However, it is obvious that one or more embodiments can be implemented without these details. In other instances, known structures and devices are illustrated so as to simplify the accompanying drawings.

Thicknesses and shapes of respective layers in the drawings do not reflect a real scale of the light guide plate, the backlight module and the display apparatus. It is only used to schematically illustrate the present disclosure.

According to a general inventive concept of an embodiment of the present application, it provides a light guide plate, including a first surface and a second surface arranged opposite to the first surface. The second surface includes a network node region in which a plurality of network nodes are provided so that light rays entering the light guide plate can exit from the first surface; and at least one protrusion located within an area between an outer edge of the network node region of the second surface and an edge of the light guide plate, wherein a height by which the protrusion projects out from the second surface is larger than that by which the network nodes project out from the second surface.

Figure 2:
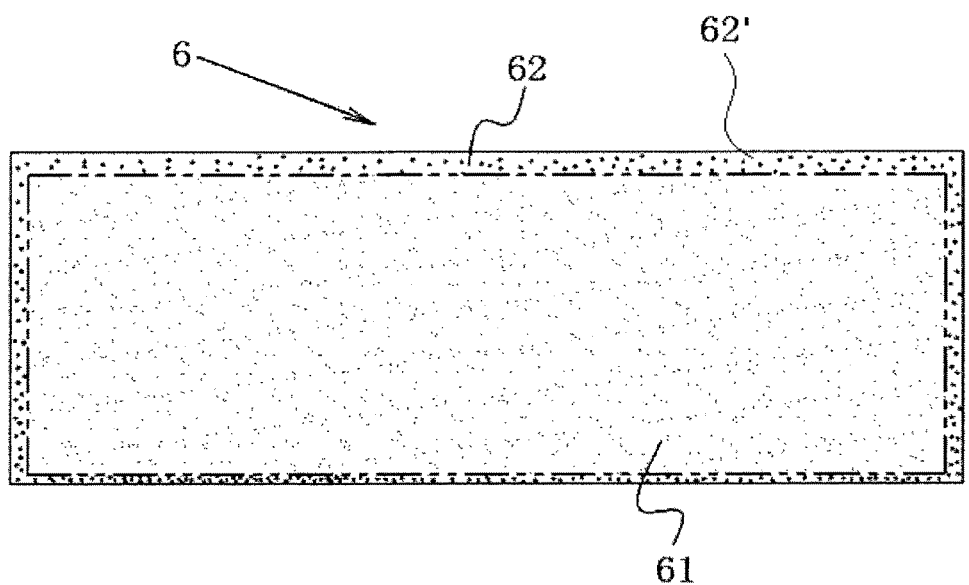
FIG. 2 is a plan view for schematically showing one surface of a light guide plate in accordance with a first illustrative embodiment of the present application.

FIG. 1 is an exploded and prospective view for schematically showing a display apparatus in accordance with a first illustrative embodiment of present application. FIG. 2 is a plan view for schematically showing one surface of a light guide plate in accordance with a first illustrative embodiment of the present application. As shown in FIGS. 1 and 2, the display apparatus in accordance with one illustrative embodiment of the present application includes a backlight module and a display panel 10 mounted on the backlight module. The backlight module includes a light guide plate 6 and a reflection plate 8. The light guide plate 6 includes a first surface served as a light exiting surface, and a second surface arranged opposite to the first surface. The reflection plate 8 is provided to face the second surface of the light guide plate 6, so as to reflect the light emitted from the second surface of the light guide plate into the interior of the light guide plate.

Figure 3:
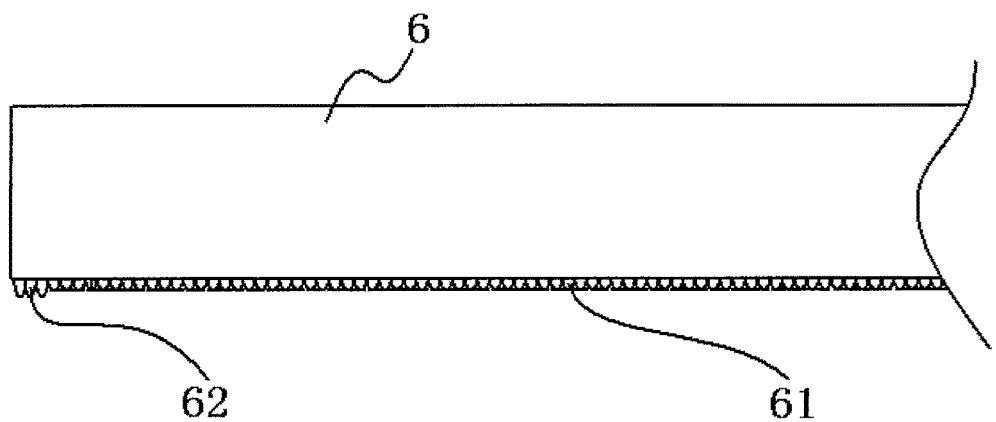
FIG. 3 is a cross-section view for schematically showing a part of the light guide plate as shown in FIG. 2.
Figure 4:
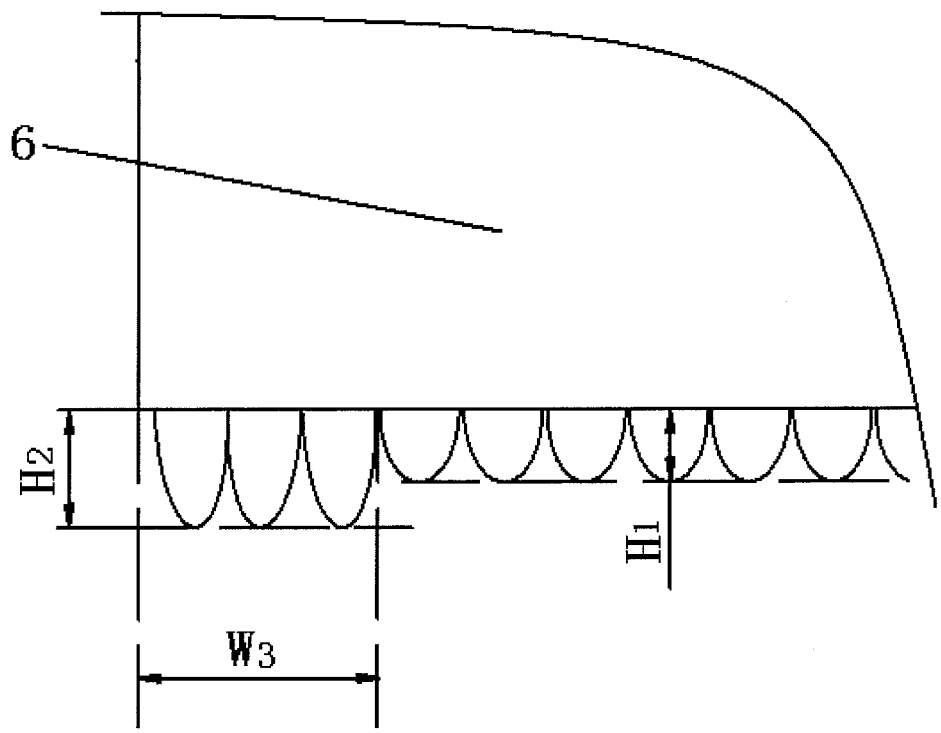
FIG. 4 is a partially enlarged view for schematically showing a lower left portion of the light guide plate as shown in FIG. 3.

FIG. 3 is a cross-section view for schematically showing a part of the light guide plate as shown in FIG. 2; and FIG. 4 is a partially enlarged view for schematically showing a lower left portion of the light guide plate as shown in FIG. 3. With reference to FIGS. 2-4, in accordance with one exemplary embodiment of the present application, the second surface of the light guide plate 6 (the lower surface as shown in FIG. 3) includes a network node region and at least one protrusion 62. The network node region is provided with a plurality of network nodes 61, which are shaped to reflect and/or scatter the light rays from the light source (which is described in detail below) entering the light guide plate 6 for example through the second surface of the light guide plate 6, so that the light rays entering the light guide plate 6 are capable of uniformly exiting from the first surface (the upper surface as shown in FIG. 3). The protrusion 62 is located in a region between the outer edge of the network node region of the second surface and the edge of the light guide plate 6, that is, arranged at the periphery of the network node region. A height by which the protrusion 62 projects out from the second surface is larger than that by which the network node 61 projects out from the second surface.

In a case that the light guide plate 6 of the embodiment of the present application is installed into the display apparatus, the light guide plate 6 is mounted onto the reflection face of the reflection plate 8, and the protrusion 62 which is slightly projected, firstly contacts and rests against the reflection face of the reflection plate 8. In one example, the protrusion 62 contacts and rests against the edge of the reflection face of the reflection plate 8, so that the contacting force between the surface of the network nodes 61 of the light guide plate 6 and the reflection face of the reflection plate 8 is weakened or there is no contact between them, and the probability that the surface of the network nodes 61 of the light guide plate 6 is scratched would be decreased, thereby maintaining the stability of optical property of the network node region.

In one example of the present application, the light guide plate 6 is made of a polycarbonate material, and the network nodes 61 and the protrusion 62 are integrated onto the second surface of the light guide plate 6. For example, during the forming process of the light guide plate, firstly a main body of the light guide plate is formed by the polycarbonate material, and network nodes 61 which are arranged centrally onto one surface (for example the above described second surface) of the light guide plate and the protrusion 62 which is arranged at the periphery of the network node region are formed integrally in sequence or simultaneously onto the surface of the light guide plate, by a precision injection molding process. In this way, the light rays entering the light guide plate will be reflected or scattered at the network node region, and then propagate to the first surface of the light guide plate along a plurality of paths, so that the light rays can exit uniformly from the first surface.

In one illustrative example, as shown in FIG. 4, the projecting height H2 of the protrusion 62 is at least 10 micrometers higher than the projecting height H1 of the network node 61. In this way, as one example, it can ensure that under the circumstance that the light guide plate 6 is placed onto the reflection plate 8, the protrusion 62 firstly contacts and rests against the reflection face of the reflection plate 8, so that the contacting force between the surface of the network nodes 61 of the light guide plate 6 and the reflection face of the reflection plate 8 is weakened or there is no contact between them, and the probability that the surface of the network nodes 61 of the light guide plate 6 is scratched would be decreased.

In one illustrative example, for example, the height of the protrusion 62 which projects from the second surface of the light guide plate is within a range of 15 to 25 µm, specifically within a range of 18 to 22 µm, more specifically the height of the protrusion 62 which projects from the second surface of the light guide plate is 20 µm. And furthermore, for example, if the height of the network node which projects from the second surface of the light guide plate is less than 10 µm, then it is not only to ensure that the network node 61 can keep the function of scattering and reflection, but also to ensure that the contacting force between the surface of the network nodes 61 of the light guide plate 6 and the reflection face of the reflection plate 8 is weakened or there is no contact between them, and the probability that the surface of the network nodes 61 of the light guide plate 6 is scratched would be decreased.

Figure 5:
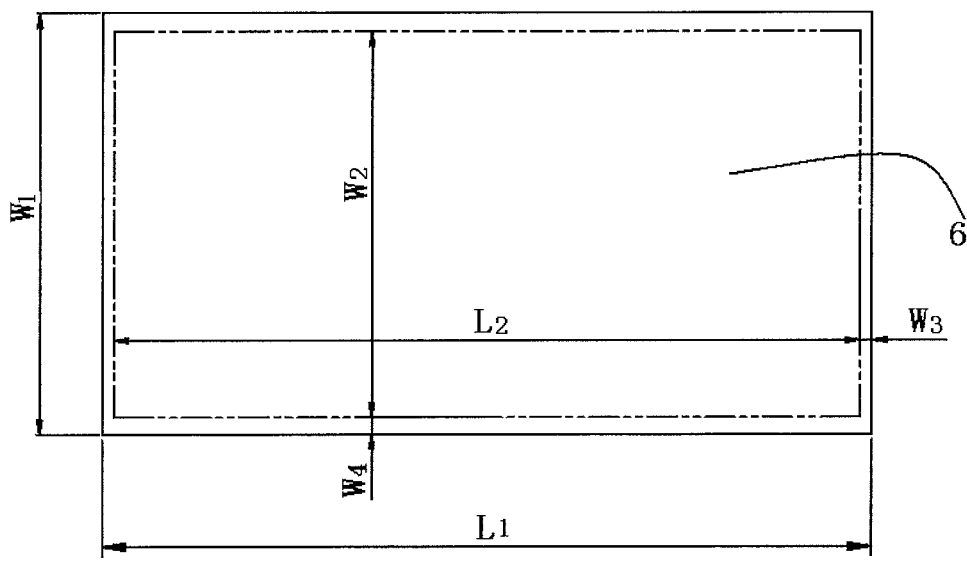
FIG. 5 is plain view for schematically showing a size of the portion on a surface of the light guide plate in accordance with one illustrative embodiment of the present application.

In one illustrative embodiment, with reference to FIG. 5, in a plain view, the second surface of the light guide plate 6 is substantially rectangular and has a length L1 and a width W1. The network node region having network nodes 61 within the second surface of the light guide plate 6 is also rectangular, having a length L2 and a width W2. Apparently, the length L1 is larger than the length L2, and the width W1 is wider than the width W2. The protrusion 62 has a dimension W4 in a lengthwise direction of the rectangular light guide plate for example within a range of 0.7-1.3 millimeters, more specifically for example to be 1 millimeter. The protrusion 62 has a dimension W3 in a widthwise direction of the rectangular light guide plate for example within a range of 1.2-1.8 millimeters, more specifically for example to be 1.5 millimeter. In this way, the protrusion 62 will have sufficiently large strength so that the contacting force between the surface of the network nodes 61 of the light guide plate 6 and the reflection face of the reflection plate 8 is weakened or there is no contact between them.

In one illustrative embodiment, the largest thickness of the light guide plate 6 is for example within a range of 0.7 to 1 millimeters, specifically to be approximately 0.85 millimeters. For example, the length L1 of the light guide plate 6 is substantially in a range of 60 to 72 millimeters, and the width W1 thereof is in a range of 32 to 40 millimeters. In this case, the length L2 of the network node region is for example within a range of 59 to 69 millimeters, more specifically to be approximately 64 millimeters; and the width W2 of the network node region is for example within a range of 28 to 38 millimeters, more specifically to be approximately 33 millimeters. In this way, the light guide plate in accordance with the present embodiment can be applicable into for example the small sized display apparatus, for example applicable into a mobile phone. It should be understood that various sizes of the light guide plate according to the embodiment of the present application are not limited to the above values, and can be increased or decreased so as to meet needs for the display apparatus having different sizes.

In accordance with the embodiment of the present application, at least one protrusion 62 is located at a region between an outer edge of the network node region of the second surface of the light guide plate 6 and an edge of the light guide plate 6. In one illustrative example, as shown in FIG. 4, a plurality of the protrusions 62 are arranged around the network node region. In this way, the plurality of the protrusions 62 around the network node region can avoid the network nodes 61 directly contacting and resting closely against the reflection face of the reflection plate 8, while having the functions of diffusing and reflecting the light rays entering the light guide plate 6. Further, the protrusions 62 and the network nodes 61 are formed by the injection molding process.

In one alternative embodiment, the second surface of the light guide plate 6 includes one continuous protrusion arranged around the network node region. The protrusion is formed with a plurality of sub-protrusions thereon, which are shaped to reflect the light entering the light guide plate into the light exiting from the first surface. They can be formed to be a scattering-reflection network node structure which is protruded from the edge and has the function similar to the network node region as described in the above embodiment. In this way, such protrusion can not only avoid the network nodes pressing the reflection face of the reflection plate, but also the sub-protrusions thereof can scatter and reflect the light rays entering the light guide plate.

In another alternative embodiment, the plurality of protrusions can be disposed to be separated from each other between the network node region and the outer edge of the light guide plate, that is, not directly adjoined with each other. For example, at least one separate protrusions are respectively provided at an edge of the light guide plate in a lengthwise direction thereof and an edge thereof in a widthwise direction. Each of the protrusions includes at least one projections. In a further alternative embodiment, the protrusions 62 can be arranged to be a continuous cofferdam structure 62' around the network node region.

In accordance with a further embodiment of the present application, it provides a backlight module, including the light guide plate 6 according to any of the above embodiments and a reflection plate 8 which is arranged to face the second surface of the light guide plate 6. The protrusions 62 correspond to the edge of the reflection plate 8. In the backlight module in accordance with the present embodiment, the light guide plate 6 is mounted on the reflection face of the reflection plate 8, and the protrusion 62 which is slightly projected, firstly contacts and rests against the reflection face of the reflection plate 8, so that the contacting force between the surface of the network nodes 61 of the light guide plate 6 and the reflection face of the reflection plate 8 is weakened or there is no contact between them, and the probability that the surface of the network nodes 61 of the light guide plate 6 is scratched would be decreased, thereby maintaining the stability of optical property of the network node region.

As shown in FIG. 1, the backlight module of the present embodiment further includes: a light source 2, provided at a side of the light guide plate 6 to produce the light rays incident onto the light guide plate 6; a diffuser 5, provided on the first surface of the light guide plate 6 so as to more uniformly distribute the reflected light rays at the light guide plate 6; and a first prism 4, provided onto the diffuser 5, so as to modify a light transmission direction of the light rays and having a function of concentrating the light so as to improve the light intensity of the light rays. In addition, the backlight module further includes a second prism 3, provided onto the first prism 4; a back plate 9 into which the reflection plate 8, the light guide plate 6, the diffuser 5, the first prism 4 and the second prism 3 are installed in sequence; and a sealing frame 7 installed at an inner side of the back plate 9 so as to fix the components such as the reflection plate 8, the light guide plate 6 and the diffuser 5, and to improve the sealing of the backlight module.

In one illustrative embodiment of the present application, the light source 2 includes at least one LED strip 2' (which is shaped into a strip of the light source 2 as shown in FIG. 1). The LED strip 2' is provided at an upper surface of the second prism 3 at one side end thereof, i.e., an upper edge thereof. The LED strip served as the light source can reduce the power consumption and improve the brightness of the light rays. Generally, the prism in the first prism 3 is arranged to extend in a direction perpendicular to the direction in which the prism of the second prism 4 extends, so as to improve the effect of concentrating the light.

The backlight module of the embodiment of the present application further includes a light shielding zone 1, provided onto the second prism 3 and covering the LED strip serving as the light source 2 and the edge of the second prism 3. In this way, this can prevent the light rays exiting from the edge of the backlight module, and enhance the display effect.

In accordance with a yet further embodiment of the present application, as shown in FIG. 1, it provides a display apparatus, including the backlight module as described in any of the various embodiment above; and a display panel 10 mounted at a light exiting side of the backlight module. The display apparatus can be any products or components having the displaying function, such as a display panel, a mobile phone, a tablet computer, TV, a displayer, a notebook computer, a digital photo frame, a navigator, or an electrical paper.

With the light guide plate, the backlight module and the display apparatus in accordance with the above embodiments of the present application, a plurality of projections or protrusions which project slightly higher than the network nodes of the light guide plate, are evenly distributed at a blank region around the network nodes of the light guide plate. In this way, during the contacting process of the light guide plate and the reflection face of the reflection plate, those slightly higher projections or protrusions firstly contact and rest against the reflection face, so that the contacting force between the network node face of the light guide plate and the reflection face will be weakened, and the probability that the network node face of the light guide plate will be scratched is decreased, thereby improving the display effect of the display apparatus.

The above described specific embodiments are only intended to further explain the objectives, the technical solutions and the advantageous effect of the present application in detail. It should be understood that they are only a part of embodiments of the present application, rather than to limit the scope of the present application. As for those skilled in the art, any modification, equivalents or replacement shall be considered within the scope of the present invention, based on the disclosure of the present invention, without departing from the spirits and principle of the present application. Therefore, the protection scope of the present application shall be defined by the appended claims.

What is claimed is:

1. A light guide plate, comprising a first surface and a second surface arranged opposite to the first surface, wherein the second surface comprises:
   a network node region in which a plurality of network nodes are provided, so that light entering the light guide plate is capable of exiting from the first surface; and
   plurality of protrusions, located at a region between an outer edge of the network node region of the second surface and an edge of the light guide plate, wherein a height of each of the plurality of protrusions which projects from the second surface is larger than that of the network node which projects from the second surface,
   wherein the plurality of protrusions are provided to be a continuous barrier structure around the network node region.

2. The light guide plate as claimed in claim 1, wherein the light guide plate is made of a polycarbonate material, and the network nodes and the plurality of protrusions are integrally formed onto the second surface of the light guide plate.

3. The light guide plate as claimed in claim 1, wherein the height each of the plurality of protrusions which project from the second surface is at least 10 μm larger than that of the network node which projects from the second surface.

4. The light guide plate as claimed in claim 1, wherein the second surface of the light guide plate is substantially rectangular, and each of the plurality of protrusions has a dimension in a lengthwise direction of the rectangular light guide plate within a range of 0.7 to 1.3 millimeters and a dimension in a widthwise direction of the rectangular light guide plate within a range of 1.2 to 1.8 millimeters.

5. The light guide plate as claimed in claim 1, wherein a thickness of the light guide plate is within a range of 0.7 to 1 millimeters, a length of the light guide plate is in a range of 60 to 72 millimeters, and a width thereof is in a range of 32 to 40 millimeters.

6. The light guide plate as claimed in claim 1, wherein the plurality of protrusions comprise one continuous protrusion around the network node region which is formed thereon with a plurality of sub-protrusions.

7. A backlight module, comprising:
   the light guide plate according to claim 1; and
   a reflection plate, provided to face the second surface of the light guide plate, and the plurality of protrusions corresponding to an edge of the reflection plate.

8. The light guide plate as claimed in claim 3, wherein the height each of the plurality of protrusions which project from the second surface is within a range of 15 to 25 μm.

9. The backlight module as claimed in claim 7, further comprising:
a light source provided at a side of the light guide plate;
a diffuser provided on the first surface of the light guide plate; and
a first prism provided onto the diffuser.

10. A display apparatus, comprising:
the backlight module according to claim 7; and
a display panel, mounted at a light exiting side of the backlight module.

11. The backlight module as claimed in claim 7, wherein the light guide plate is made of a polycarbonate material, and the network nodes and the plurality of protrusions are integrally formed onto the second surface of the light guide plate.

12. The backlight module as claimed in claim 7, wherein the height each of the plurality of protrusions which project from the second surface is at least 10 μm larger than that of the network node which projects from the second surface.

13. The backlight module as claimed in claim 9, further comprising:
a second prism provided onto the first prism;
a back plate into which the reflection plate, the light guide plate, the diffuser, the first prism and the second prism are installed; and
a sealing frame installed at an inner side of the back plate.

14. The backlight module as claimed in claim 13, wherein the light source includes at least one LED strip provided at an upper edge of the second prism.

15. The backlight module as claimed in claim 14, further comprising a light shielding zone provided onto the second prism and covering the LED strip and the edge of the second prism.

16. The backlight module as claimed in claim 12, wherein the height each of the plurality of protrusions which project from the second surface is within a range of 15 to 25 μm.

17. A light guide plate, comprising a first surface and a second surface arranged opposite to the first surface, wherein the second surface comprises:
a network node region in which a plurality of network nodes are provided, so that light entering the light guide plate is capable of exiting from the first surface; and
a plurality of protrusions, located at a region between an outer edge of the network node region of the second surface and an edge of the light guide plate, wherein a height of each of the plurality of protrusions which project from the second surface is larger than that of the network node which projects from the second surface, wherein the plurality of the protrusions are provided to be separated from each other between the network node region and the edge of the light guide plate, without being adjoined with each other.

18. The light guide plate as claimed in claim 17, wherein at least one protrusion to be separated is provided at each of an edge of the light guide plate along a lengthwise direction thereof and an edge of the light guide plate along a widthwise direction thereof, and each of the at least one protrusion to be separated comprises at least one projection.

* * * * *